United States Patent [19]

Huang et al.

[11] Patent Number: 4,872,086
[45] Date of Patent: Oct. 3, 1989

[54] DIELECTRIC RF DEVICES SUITED FOR USE WITH SUPERCONDUCTORS

[75] Inventors: Rong F. Huang; Wei-Yean Howng, both of Albuquerque, N. Mex.

[73] Assignee: Motorola, Inc., Schaumburg, Ill.

[21] Appl. No.: 260,548

[22] Filed: Oct. 20, 1988

[51] Int. Cl.[4] .............................................. H01G 4/10
[52] U.S. Cl. ............................................ 361/321; 505/1
[58] Field of Search ....................... 252/62.2, 62.3 BT; 501/136, 138; 361/321

[56] References Cited

U.S. PATENT DOCUMENTS

| | | | |
|---|---|---|---|
| 2,369,327 | 2/1945 | Wainer | 361/321 X |
| 3,086,150 | 4/1963 | Held | 361/321 X |
| 3,179,525 | 4/1965 | Welsby et al. | 361/321 X |
| 4,072,780 | 2/1978 | Zillman | 361/321 X |
| 4,490,733 | 12/1984 | Kroger | 357/5 |
| 4,780,435 | 10/1988 | Chu et al. | 501/136 |
| 4,781,859 | 11/1988 | Noi | 252/521 X |

FOREIGN PATENT DOCUMENTS 2462480  5/1977  Fed. Rep. of Germany ...... 361/321

OTHER PUBLICATIONS

Appl. Phys. Lett. 52(22), May 1988, pp. 1904 to 1906. Preparation, Patterning, and Properties of Thin $YBa_2Cu_3O_{7-\delta}$ Films, J. W. C. de Vries et al.

*Primary Examiner*—Donald A. Griffin
*Attorney, Agent, or Firm*—Joseph P. Krause; Steven Parmelee; Anthony Sarli

[57] ABSTRACT

Ceramic dielectric substrates, calcium titanate, bismuth titanate and strontium titanate, used with superconductor, Ytrium Barium Copper Oxide, or YBC, as an electrode, produce a superconducting electrical device, useable as a filter or capacitor. The electrical device formed by using one of the dielectrics taught herein in combination with YBC, is mechanically stable in comparison to prior art ceramic dielectrics that used YBC for an electrode material, in that the YBC is substantially free of microcracks and remains bonded to the substrates.

19 Claims, 1 Drawing Sheet

DIELECTRIC RF DEVICES SUITED FOR USE WITH SUPERCONDUCTORS

BACKGROUND OF THE INVENTION

In general, this invention relates to capacitive devices such as capacitors and filters. In particular, this invention relates to such devices constructed of metallic electrodes attached to ceramic dielectrics.

To reduce the physical size of such devices, and retain their electrical capacity, ceramic materials are frequently used as dielectrics instead of air or other dielectric materials. Using a ceramic material for a dielectric in combination with a metallic electrodes permits a substantial reduction in the physical size of a capacitor or filter while retaining or even increasing its electrical capacitance.

Reducing the physical size of a capacitor by using dielectrics is not without drawbacks however. As the physical size of the capacitor decreases, the dimensions of electrodes attached to the dielectric must of course also decrease. As the frequency of a signal applied to the capacitor increases and the physical size of the electrodes decreases, "skin effect" losses in the electrodes become more substantial. Further reductions in physical size of the capacitor must accommodate increasing skin effect losses attributable to smaller electrode dimensions.

One solution to the problem of increased skin effect losses in small capacitive devices operated at high frequencies is the use of superconducting electrodes attached to a ceramic dielectric. The electrical resistance of a superconductor is practically zero when the superconductor is at or below its transition temperature. Since skin-effect losses are related to electrical resistance, such losses are minimized by the use of superconductors.

One recently discovered superconductor, Ytrium-BariumCopper-Oxide, ($YBa_2Cu_3O_x$) or YBC as it is know in the art, is particularly attractive to use as an electrode because it superconducts above the temperature of liquid nitrogen. Because of its relatively high transition temperature, YBC, when applied to a ceramic substrate, can be used to provide a superconducting electrode.

A problem with using YBC as a superconducting electrode with conventional, prior art ceramics has been the relatively large difference between the thermal expansion coefficients of YBC and prior art ceramic dielectrics. When YBC is deposited on a conventional ceramic dielectric substrate and cooled to its transition temperature, mechanical stresses between the YBC and ceramic caused by differences between thermal expansion coefficients create stresses that cause micro-cracks to develop at the interface between the dielectric and superconductor after temperature cycling. The microcracks between the ceramic and YBC create a resistance which defeats the purpose of using the superconductor. Repetitive temperature cycling increases the number of micro-cracks which further reduces the effective conducting cross-section and increases the resistance of the superconductor. In addition, the microcracks developed between the dielectric ceramic and the superconductor electrode will deteriorate the effective dielectric "Q" or quality factor due to the reduction of coupling between dielectric and electrodes.

Known ceramic materials which have compatible thermal expansion coefficients have dielectric constants which are relatively low, reducing their usefulness as filters or capacitors at high frequencies. Some ceramics having compatible thermal expansion coefficients and high dielectric constants have been found to adversely affect the superconductor, lowering its transition temperature. This effect caused by the ceramic is known as "poisoning" of the superconductor.

It is therefore an object of the present invention to provide an electrical device having a ceramic dielectric with a thermal expansion coefficient compatible with YBC electrodes.

SUMMARY OF THE INVENTION

According to the present invention, there is provided a capacitive device, useable as a filter or capacitor, with superconducting electrodes of YBC and a ceramic dielectric material. The ceramic dielectrics taught herein have dielectric constants of at least 100 at frequencies around 400 MHz and thermal expansion coefficients that are compatible with the thermal expansion coefficient of YBC such that the YBC is bonded to the ceramic material and is substantially free of mechanical defects, such as microcracks in the YBC. Repetitive temperature cycling between the superconductors transition temperature and nominal room temperatures do not affect the mechanical stability of the device.

DETAILED DESCRIPTION OF THE PREFERRED EMBODIMENT

Figure 1:
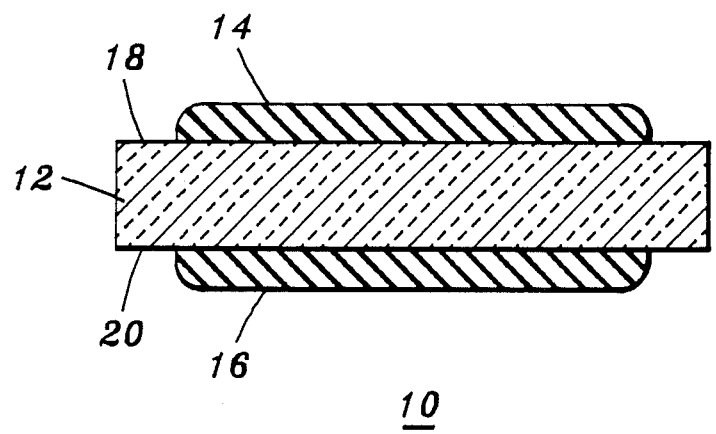
FIG. 1 shows a representative cross-sectional view of the capacitive device. A ceramic dielectric is "sandwiched" between layers of superconducting YBC.

FIG. 1 shows a schematic cross-sectional view of a capacitive device 10 contemplated by the invention. Superconducting electrodes 14 and 16 are deposited upon opposing surfaces 18 and 20 of dielectric substrate 12 by any appropriate method as disclosed below. In the preferred embodiment, superconducting electrodes 14 and 16 are comprised of Ytrium Barium Copper Oxide, ($YBa_2Cu_3O_x$) or YBC as it is known in the art. This material is known to have a transition temperature higher than the temperature of liquid nitrogen and a thermal expansion coefficient of approximately 14–15 parts per million per degree centigrade.

This invention addresses ceramic dielectric materials which possess thermal expansion coefficients compatible with YBC, have sufficiently high dielectric constants at high frequencies so as to produce useable capacitance values at operating frequencies above 400 mHz and do not poison the superconductor when the superconductor is deposited on the ceramic.

Calcium titanate, bismuth titanate and strontium titanate were experimentally identified as being compatible with the YBC and had the desired physical and electrical characteristics. The dielectric constants and Q-factors of these materials were measured at room temperature, (approximately 20 degrees centigrade) with an applied signal of 430 mHz. The results of these tests are summarized in Table 1 below.

TABLE 1

| Compound Formula | Dielectric Constant | Q-factor | Expansion Coefficient |
| --- | --- | --- | --- |
| $CaTiO_3$ | 365 | 1150 | 11.7 |
| $Bi_4Ti_3O_{12}$ | 126 | 40 | 11–14 |

TABLE 1-continued

| Compound Formula | Dielectric Constant | Q-factor | Expansion Coefficient |
|---|---|---|---|
| SrTiO$_3$ | 230 | 530 | 10.3 |

Calcium Titanate, Bismuth Titanate and Strontium Titanate, were all found to be sufficiently compatible with the thermal expansion coefficient of YBC such that the ceramic and YBC remained bonded, (i.e. no microcracks developed after temperature cycling), all had dielectric constants that are considered high above 400 MHz and none poisoned the YBC when the YBC was deposited on them.

The Calcium titanate dielectric material according to the present invention is obtained by first mixing together, calcium carbonate, CaCO$_3$, lead oxide, PbO, titanium dioxide, TiO$_2$, and cadmium oxide, CdO, in the respective proportions by weight of 32.00 percent, 30.62 percent, 36.53 percent and 0.85 percent. Deionized water is added to this to form a free-flowing slurry which is then mixed 4 to 6 hours in a milling jar. After mixing, the slurry is dried in an oven to remove the water. The dried mixture is finally heated in a furnace to calcinize the mixture to form calcium titanate.

The Bismuth titanate dielectric material according to the present invention is obtained by first mixing together, bismuth oxide, Bi$_2$O$_3$ and titanium dioxide, TiO$_2$, in the respective proportions by weight of 79.54 precent and 20.46 percent. Deionized water is added to form a free-flowing slurry which is then mixed 4 to 6 hours in a milling jar. After mixing the slurry is dried in an oven to remove the water then heated in a furnace to form bismuth titanate.

The Strontium titanate dielectric material according to the present invention is obtained by first mixing together, strontium oxide, SrO, titanium dioxide, TiO$_2$, niobium pentoxide Nb$_2$O$_5$, lead oxide, PbO, and cadmium oxide, CdO, in the respective proportions by weight of 36.72 percent, 27.78 percent, 23.55 percent, 9.29 percent and 2.67 percent. De-ionized water is also added to form a slurry which is also mixed 4 to 6 hours in a milling jar. After mixing, the slurry is dried in a furnace to remove the water then heated in a furnace to form bismuth titanate.

The lead oxide added to form the calcium titanate and strontium titanate improves dielectric constants and Q-factors. Niobium pentoxide is also added to the strontium titanate to improve dielectric constant and Q-factor of the substrate.

To make a ceramic substrate from one of these compounds, the compound is first mixed with a liquid binding agent to form a slurry so that the substrate can be formed by "tape casting" it onto a glass plate. Tape casting is a process well known to those skilled in the art and produces substrate thicknesses of approximately 25 mils. After being tape cast, the individual substrates are then cut on the glass plate into 2 inch by 2 inch squares, using any convenient means.

After cutting, the squares are fired or sintered. Firing the squares burns off the binding agent and hardens the squares. The temperature is raised from room temperature to about 450 degrees centigrade at about 50 centigrade degrees per hour, in air, at 1 atmosphere. After reaching 450 degrees centigrade, the temperature of the substrate is held constant for approximately 30 minutes. The temperature is then increased from 450 degrees centigrade to the sintering temperature of the substrate material which is maintained for 2–3 hours. Note from Table 2 that each of the three substrate materials has a slightly different temperature. After maintaining the sintering temperture for 2–3 hours, the substrate is cooled to room temperature at 100 degrees centigrade per hour.

TABLE 2

| Compound | Sintering temperature, degrees C. |
|---|---|
| CaTiO$_3$ | 1220–1250 |
| Bi$_4$Ti$_3$O$_{12}$ | 1000–1050 |
| SrTiO$_3$ | 1250–1270 |

To make a capacitive device using one of the subject ceramic substrates, the superconducting YBC is deposited onto the substrate by any convenient method including thick film deposition, screen printing or painting.

Firing the YBC requires that after deposition onto a substrate, the YBC be carefully heated and cooled in the continuous presence of oxygen to insure that the YBC will absorb sufficient amounts of oxygen to superconduct. The firing process bonds the YBC to the substrate and insures that it will superconduct.

To fire the YBC, the temperature of the YBC and substrate is first increased from room temperature to approximately 325 to 375 degrees centigrade at approximately 1 atmosphere of oxygen. After reaching 325–375 degrees, the temperature is increased to approximately 475 degrees centigrade at 50 centigrade degrees per hour, again under 1 atmosphere of oxygen. After reaching 475 degrees centigrade, the temperature is again increased to approximately 975 degrees centigrade at 100 to 150 centigrade degrees per hour under approximately 1 atmosphere of oxygen. The temperature of 975 degrees centigrade is maintained for approximately 1 to 3 hours, depending on film thickness to bond the YBC to the substrate.

After the YBC is bonded to the substrate, the temperature of the YBC and substrate is reduced from 975 degrees centigrade to approximately 650 degrees centigrade, at 100 degrees per hour under 1 atmosphere pressure. From 650 degrees the temperature is reduced to 450 degrees at 50 degrees per hour. From 450 degrees to room temperature, the temperature is lowered at any convenient rate, such as 100 degrees centigrade per hour, while maintaining the presence of oxygen at approximately 1 atmosphere to insure the YBC absorbs sufficient amounts of oxygen.

Using thick film deposition techniques, the thickness of the YBC can be as thin as 1 mil without the YBC cracking during the firing process. The YBC can be deposited by any convenient means including thin film or thick film deposition techniques, screening printing or painting or other appropriate means.

All three of the aforementioned ceramics demonstrated dielectric constants of at least 100 when operated at frequencies around 400 MHz. YBC deposited and cured on these ceramics did not develop microcracks during the curing process and none of the aforementioned ceramics demonstrated any poisoning or contamination of the superconductor when the superconductor was deposited upon them.

We claim:

1. An electrical device comprising:
   a ceramic dielectric of a first suitable titanate material having a dielectric constant K of at least 100 at radio frequencies over 400 megahertz having thermal expansion coefficient between 10 and 14 parts per million per degree centigrade and having at least first and second sides; and at least one superconducting electrode disposed onto both of said first and second sides of said dielectric said electrode having a thermal expansion coefficient of approximately 14 to 15 parts per million per degrees centigrade and superconducting at at least one temperature above the temperature of liquid nitrogen, said electrode being substantially free of micro-cracks after repetitive temperature cycling between at least the temperature of liquid nitrogen and room temperature.

2. The device of claim 1 where said electrode is made of Ytrium Barium Copper Oxide, $YBa_2Cu_3O_x$.

3. The device of claim 1 where said ceramic dielectric is made of a material selected from the group consisting of $CaTiO_3$, $Bi_4Ti_3O_{12}$ and $SrTiO_3$.

4. The device of claim 1 where said ceramic dielectric is made of a material selected from the group consisting of $CaTiO_3$, $Bi_4Ti_3O_{12}$ and $SrTiO_3$.

5. The device of claim 1 where said device is a capacitor.

6. The device of claim 1 where said device is a filter.

7. The device of claim 1 where said ceramic dielectric is $CaTiO_3$.

8. The device of claim 1 where said ceramic dielectric is $Bi_4Ti_3O_{12}$.

9. The device of claim 1 where said ceramic dielectric is $SrTiO_3$.

10. An electrical device comprising:

a ceramic dielectric of a first suitable titanate material having a dielectric constant K of at least 100 at radio frequencies over 400 Megahertz and having at least first and second sides; and at least one superconducting electrode disposed onto both of said first and said second sides of said dielectric said electrodes superconducting electric current at at least one temperature above the temperature of liquid nitrogen, said electrode being substantially free of micro-cracks after temperature cycling between the temperature of liquid nitrogen and room temperature, said electrodes and said dielectric having thermal expansion coefficients substantially similar such that said electrodes remain firmly bonded to said ceramic dielectric, said dielectric not poisoning said electrodes.

11. The device of claim 10 where said electrode has a thermal expansion coefficient of approximately 14–15 parts per million per degree centigrade, said electrode superconducting at at least one temperature above the temperature of liquid nitrogen.

12. The device of claim 10 where said electrode is made of Ytrium Barium Copper Oxide, $YBa_2Cu_3O_x$.

13. The device of claim 12 where said ceramic dielectric is made of a material selected from the group consisting of $CaTiO_3$, $Bi_4Ti_3O_{12}$ and $SrTiO_3$.

14. The device of claim 10 where said ceramic dielectric is made of a material selected from the group consisting of $CaTiO_3$, $Bi_4Ti_3O_{12}$ and $SrTiO_3$.

15. The device of claim 10 where said device is a capacitor.

16. The device of claim 10 where said device is a filter.

17. The device of claim 10 where said ceramic dielectric is $CaTiO_3$,

18. The device of claim 10 where said ceramic dielectric is $Bi_4Ti_3O_{12}$.

19. The device of claim 10 where said ceramic dielectric is $SrTiO_3$.

* * * * *